(12) United States Patent
Deshpande

(10) Patent No.: US 10,070,005 B2
(45) Date of Patent: Sep. 4, 2018

(54) IDENTIFICATION DOCUMENT HOLDING SYSTEM

(71) Applicant: Sonali Deshpande, Toronto (CA)

(72) Inventor: Sonali Deshpande, Toronto (CA)

( * ) Notice: Subject to any disclaimer, the term of this patent is extended or adjusted under 35 U.S.C. 154(b) by 334 days.

(21) Appl. No.: 14/694,836

(22) Filed: Apr. 23, 2015

(65) Prior Publication Data

US 2016/0309862 A1 Oct. 27, 2016

(51) Int. Cl.
*A45C 11/18* (2006.01)
*H04N 1/387* (2006.01)

(52) U.S. Cl.
CPC ........... *H04N 1/3872* (2013.01); *A45C 11/18* (2013.01); *A45C 2200/15* (2013.01)

(58) Field of Classification Search
CPC ............. H04N 1/00244; H04N 1/3872; H04N 2201/0081; A45C 11/18; A45C 11/182
USPC .................................... 150/147, 145; 281/31
See application file for complete search history.

(56) References Cited

U.S. PATENT DOCUMENTS

| 6,713,406 | B1* | 3/2004 | Fu ..................... | H01L 21/02129 |
| | | | | 257/E21.241 |
| 9,330,142 | B2* | 5/2016 | Partington ......... | G06K 9/00973 |
| 9,501,882 | B2* | 11/2016 | Saravanan .......... | G07C 9/00111 |
| 2004/0160053 | A1* | 8/2004 | Lansing .................. | A45C 11/18 |
| | | | | 281/31 |
| 2005/0028911 | A1* | 2/2005 | Canavan ................ | A45C 11/18 |
| | | | | 150/145 |
| 2010/0001507 | A1* | 1/2010 | Sblendorio ............ | A45C 11/18 |
| | | | | 283/75 |
| 2011/0267795 | A1* | 11/2011 | Kim ....................... | A45C 11/18 |
| | | | | 361/818 |
| 2014/0079318 | A1* | 3/2014 | Hasegawa ............... | G06F 3/017 |
| | | | | 382/165 |
| 2014/0368006 | A1* | 12/2014 | Taylor ................... | A47D 1/004 |
| | | | | 297/188.11 |

\* cited by examiner

*Primary Examiner* — Sue A Weaver
(74) *Attorney, Agent, or Firm* — John D. Tran; Rhema Law Group

(57) ABSTRACT

An identification document holding system and method can include: an outer cover having: a hinge, a top flap having a top flap inner portion in direct contact with the hinge and a top flap body extending away from the top flap inner portion and the top flap body terminating in a top flap outer side, and a bottom flap having a bottom flap inner portion in direct contact with the hinge and a bottom flap body extending away from the bottom flap inner portion and the bottom flap body terminating in a bottom flap outer side; a top pocket with a top pocket opening near the hinge and the top pocket configured to hold pages of the identification document; a bottom pocket with a bottom pocket opening at a distance larger than the distance between the top pocket opening and the hinge, the bottom pocket configured to hold a bottom end of an identification document and leave identification information on the identification document fully readable and exposed therefrom; and wherein the identification document holding system is configured to be fixed in an open position when the identification document is contained therein.

8 Claims, 4 Drawing Sheets

IDENTIFICATION DOCUMENT HOLDING SYSTEM

TECHNICAL FIELD

This disclosure relates to an article designed to hold identification documents, more particularly to a system for easy holding, display, and photographic duplication of identification documents.

BACKGROUND

The Hospitality industry is rapidly moving into the digital age enabling hospitality providers to track and store information about guests. Of particular importance is the information contained on a passport, driver's license, or ID card. Technology is also enabling the hospitality industry to utilize handheld devices for this application.

Hospitality providers generally collect this information at the time of checkin; however, at the present this can be a very time-consuming and labor intensive process. Market pressures and consumer expectations shaping the hospitality industry generally require information gathering at checkin to be streamlined, straightforward, not labor intensive, and fast.

These requirements are exacerbated because a guest's escort, who is helping the guest check-in, needs to carry the guest's luggage in one hand and small articles in the other. Further, holding identification document, such as a passport, open with one hand and taking a photograph with another has led to difficulties with getting a proper photographic duplication of the identification document without hands or fingers, with accurate image cropping, while simultaneously being clean and clear.

Solutions have been long sought but prior developments have not taught or suggested any complete solutions, and solutions to these problems have long eluded those skilled in the art. Thus there remains a considerable need for devices and methods that can provide a light functional system for digitizing information on identification documents.

SUMMARY

An identification document holding system and methods, providing significantly increased ease of use, ergonomics, and functionality for digitizing identification document information, are disclosed. The identification document holding system and methods can include: an outer cover having: a hinge, a top flap having a top flap inner portion in direct contact with the hinge and a top flap body extending away from the top flap inner portion and the top flap body terminating in a top flap outer side, and a bottom flap having a bottom flap inner portion in direct contact with the hinge and a bottom flap body extending away from the bottom flap inner portion and the bottom flap body terminating in a bottom flap outer side; a top pocket with a top pocket opening near the hinge; a bottom pocket with a bottom pocket opening at a distance larger than the distance between the top pocket opening and the hinge, the bottom pocket configured to hold a bottom end of an identification document and leave identification information on the identification document fully readable and exposed therefrom; and wherein the identification document holding system is configured to be fixed in an open position when the identification document is contained therein.

It is disclosed that embodiments of the identification document holding system are light weight due to the material and construction. Further it is disclosed that the identification document holding system is very easy to carry, and readily fits into a hospitality service provider's pocket.

It is further disclosed that embodiments of the identification document holding system disclose an inbuilt sleeve to slide front pages of the passport in so that the passport remains open during imaging and that the identification document holding system provides a black or a contrasting colored surface or background for the passports and ID cards so that images can be easily cropped and read without any user manipulation.

Other contemplated embodiments can include objects, features, aspects, and advantages in addition to or in place of those mentioned above. These objects, features, aspects, and advantages of the embodiments will become more apparent from the following detailed description, along with the accompanying drawings.

BRIEF DESCRIPTION OF THE DRAWINGS

The identification document holding system is illustrated in the figures of the accompanying drawings which are meant to be exemplary and not limiting, in which like reference numerals are intended to refer to like components, and in which.

DETAILED DESCRIPTION

Figure 1:
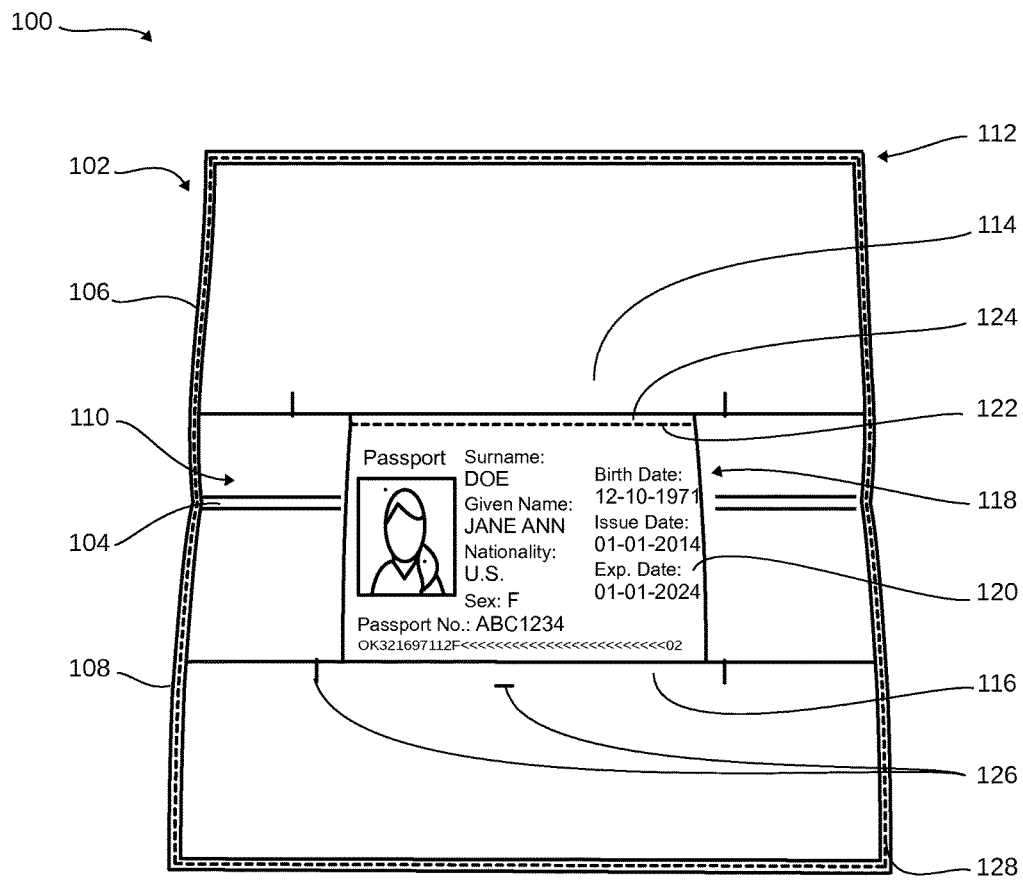
FIG. 1 is a top view of the identification document holding system in an open configuration and containing an identification document.

In the following description, reference is made to the accompanying drawings that form a part hereof, and in which are shown by way of illustration, embodiments in which the identification document holding system may be practiced. It is to be understood that other embodiments may be utilized and structural changes may be made without departing from the scope of the identification document holding system.

When features, aspects, or embodiments of the identification document holding system are described in terms of steps of a process, an operation, a control flow, or a flow chart, it is to be understood that the steps can be combined, performed in a different order, deleted, or include additional steps without departing from the identification document holding system as described herein.

The identification document holding system is described in sufficient detail to enable those skilled in the art to make and use the identification document holding system and provide numerous specific details to give a thorough understanding of the identification document holding system; however, it will be apparent that the identification document holding system may be practiced without these specific details.

In order to avoid obscuring the identification document holding system, some well-known system configurations are not disclosed in detail. Likewise, the drawings showing embodiments of the system are semi-diagrammatic and not to scale and, particularly, some of the dimensions are for the clarity of presentation and are shown greatly exaggerated in the drawing FIGs. Generally, the identification document holding system can be operated in any orientation.

Referring now to FIG. 1, therein is shown a top view of the identification document holding system 100 in an open configuration and containing an identification document. The identification document holding system 100 is shown having an outer cover 102.

The outer cover 102 is depicted having a hinge 104, a top flap 106 and a bottom flap 108. The top flap 106 and the bottom flap 108 are shown with inner portions 110 in direct contact with the hinge 104.

It is contemplated that the hinge 104 can be a fabric fold, or mechanical hinge. It is further contemplated that the inner portions 110 can be made of the same material as the hinge 104, that the inner portions 110 can be integrally formed with the hinge 104, or that the inner portions 110 can be of a different material than the hinge 104 and attached to the hinge 104.

The top flap 106 and the bottom flap 108 are shown with outer portions 112. The outer portions 112 of the top flap 106 are on opposite sides of the top flap 106 from the inner portions 110. The outer portions 112 on the bottom flap 108 are on opposite sides of the bottom flap 108 from the inner portions 110.

The top flap 106 is shown having a top pocket 114 extending from the outer portions 112 of the top flap 106 to the inner portions 110 of the top flap 106. Top pocket 114 is shown opening near the hinge 104.

The bottom flap 108 is shown having a bottom pocket 116. The bottom pocket 116 is depicted much smaller than the top pocket 114. The distance between the opening of the bottom pocket 116 and the hinge 104 is much greater than the distance between the opening of the top pocket 114 and the hinge 104.

An identification document, such as a passport 118, is shown held by the identification document holding system 100 with a biodata page 120 shown extended across the hinge 104, and exposed and fully readable between the bottom pocket 116 and the top pocket 114. Although the identification document is depicted as the passport 118 for clarity and ease of description, it is contemplated that the identification document could also be a driver's license, or ID card. The biodata page 120 of the passport 118 is also shown extending from the inner portions 110 of the bottom flap 108 down to the opening of the bottom pocket 116.

The biodata page 120 is tucked into the bottom pocket 116 near a bottom edge of the biodata page 120. It is contemplated that the bottom pocket 116 can be shallow enough for the very bottom of the biodata page 120 to be tucked therein and still have all the information on the biodata page 120 exposed from the bottom pocket 116.

The passport 118 is further shown having a binding 122 and initial pages 124. The initial pages 124 of the passport 118 can include a passport cover and front end pages. The initial pages 124 are depicted tucked into the top pocket 114 with only a small portion near the binding 122 extending out of the top pocket 114.

The binding 122 can be offset from the hinge 104 so that when the identification document holding system 100 is opened, the passport 118 folds at a different point from the hinge 104 of the identification document holding system 100 and thereby fixes the identification document holding system 100 in the open configuration. It is contemplated that when the identification document is not the passport 118 but is instead a driver's license or ID card, the hinge 104 can be positioned behind the identification document thereby fixing the identification document holding system 100 in an open configuration when the identification document is contained therein.

It has been discovered that providing the top pocket 114 and the bottom pocket 116 opening at different distances from the hinge 104 provide the unexpected ability to display the biodata page 120 of the passport 118 unobstructed when the identification document holding system 100 is opened. It was also discovered that the bottom pocket 116 and the top pocket 114 configured to hold a large portion of the initial pages 124 in the top pocket 114 and only a very bottom of the biodata page 120 in the bottom pocket 116 enable a user to slide the passport 118 into the top pocket 114 so that the identification document holding system 100 does the work of keeping the passport 118 in an open condition making imaging simple as the biodata page 120, or other desired page, can be kept open and photographed without the user having to use his hands to hold the passport 118 open.

The top flap 106 is shown extending laterally beyond sides of the passport 118 and beyond sides of the top pocket 114. The bottom flap 108 is also shown extending beyond the bottom pocket 116; however the bottom flap 108 extends laterally away from the passport 118 in a direction parallel to the hinge 104 and extends beyond the biodata page 120 of the passport 118 in a direction perpendicular to the hinge 104.

It has been discovered that providing the top flap 106 and the bottom flap 108 that extend out away from the passport 118 enables the passport 118 to be captured digitally and cropped easily because fingers do not get in the way, only the biodata page 120 is visible, and the outer cover 102 and the top pocket 114 and the bottom pocket 116 are black or a contrasting color that contrasts with the biodata page 120.

It has been discovered that the outer cover 102, including the top flap 106 and the bottom flap 108 should extend at least half the width of the passport 118 around the biodata page 120 of the passport 118 in order to provide the required contrast around the biodata page 120 for automatic capture of the biodata page 120 information and image, and for cropping of a digital photograph of the biodata page 120.

The top flap 106, the bottom flap 108, the top pocket 114, the bottom pocket 116 and the hinge 104 are contemplated to be black or a contrasting color to provide a strong contrast between the biodata page 120 and the identification document holding system 100. Large contrast provides the ability to automate the digital photography, data capture, and cropping of the biodata page 120.

The top pocket 114 is shown formed out of a sleeve on the top flap 106 and two stitches 126 on either side of the initial pages 124 of the passport 118. The bottom pocket 116 is shown formed out of a sleeve on the bottom flap 108 and three of the stitches 126. The stitches 126 forming the bottom pocket 116 can be seen to the sides of the biodata page 120 and the bottom of the biodata page 120. The sleeves can be stitched in with the seams 126. The seams 126 allow for the proper placement of the passport 118 with the biodata page 120 open.

Figure 2:
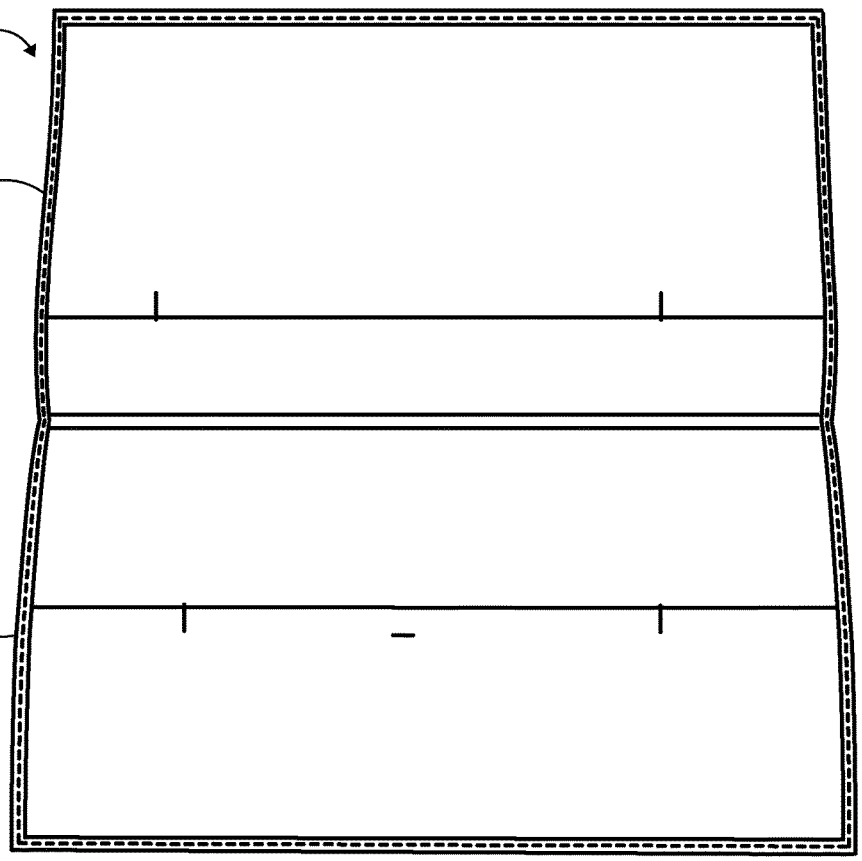
FIG. 2 is a top view of the identification document holding system of FIG. 1 without the identification document.

Referring now to FIG. 2, therein is shown a top view of the identification document holding system 100 of FIG. 1 without the identification document. The identification document holding system 100 is shown having the outer cover 102, the top flap 106, and the bottom flap 108 without the passport 118 of FIG. 1 contained therein.

Figure 3:
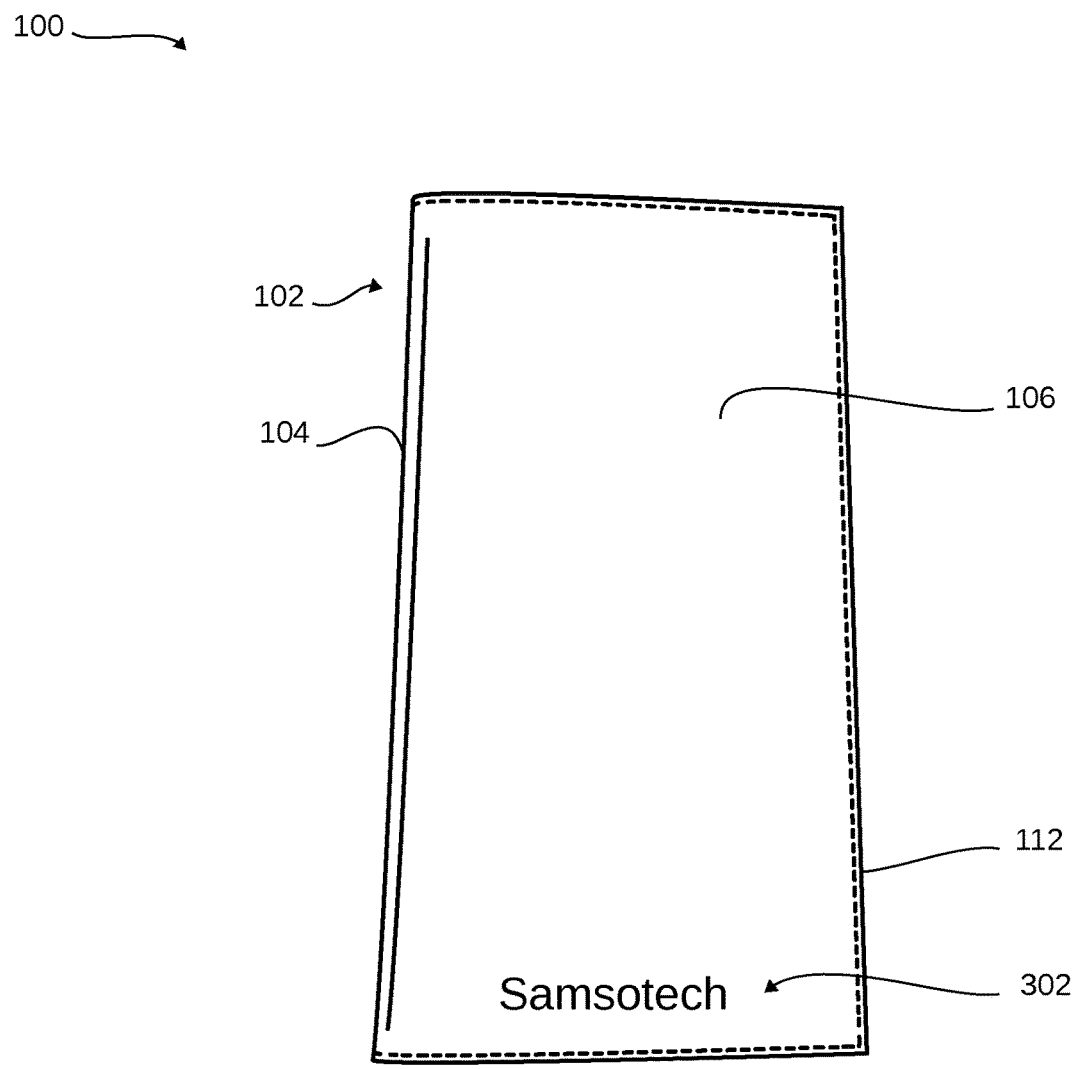
FIG. 3 is a top view of the identification document holding system of FIG. 1 in a closed configuration.

Referring now to FIG. 3, therein is shown a top view of the identification document holding system 100 of FIG. 1 in a closed configuration. The identification document holding system 100 is depicted having the outer cover 102 folded about the hinge 104. The top flap 106 is shown having a symbol 302, such as branding or a logo, extending from near the hinge 104 to the outer portions 112. When the identification document holding system 100 is in the closed configuration, the identification document of FIG. 1 is not included therein.

Figure 4:
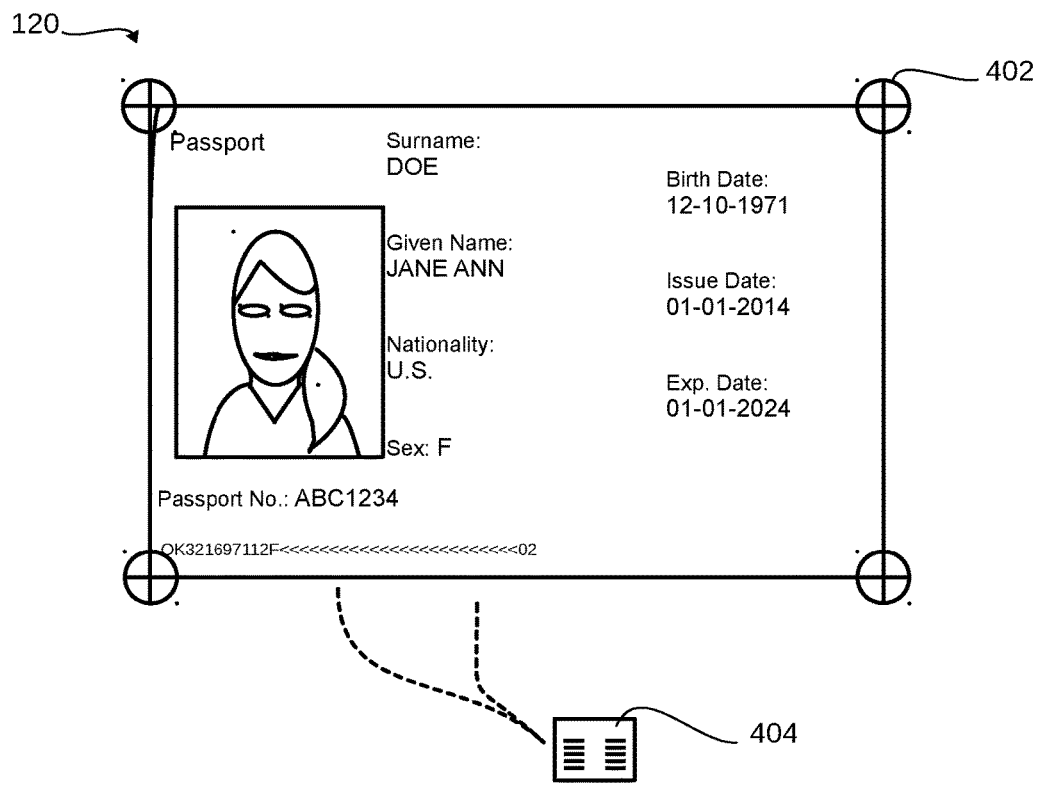
FIG. 4 is a digital reproduction of the biodata page from the passport of FIG. 1.

Referring now to FIG. 4, therein is shown a digital reproduction of the biodata page 120 from the passport 118 of FIG. 1. The biodata page 120 is shown being cropped to exclude the binding 122 of FIG. 1 and the outer cover 102 of FIG. 1.

The biodata page 120 is shown having manual adjusters 402 at each corner of the biodata page 120. It is contemplated that the crop can include any portion of the passport 118 that is exposed from the top pocket 114 of FIG. 1 or the bottom pocket 116 of FIG. 1 including the binding 122 and portions of the initial pages 124 of FIG. 1.

The biodata page 120 is shown transmitted to a server 404 having a processor via cable, wireless transmission, email, or USB. The server 404 is depicted included having a computer readable medium, useful in association with a processor.

Figure 5:
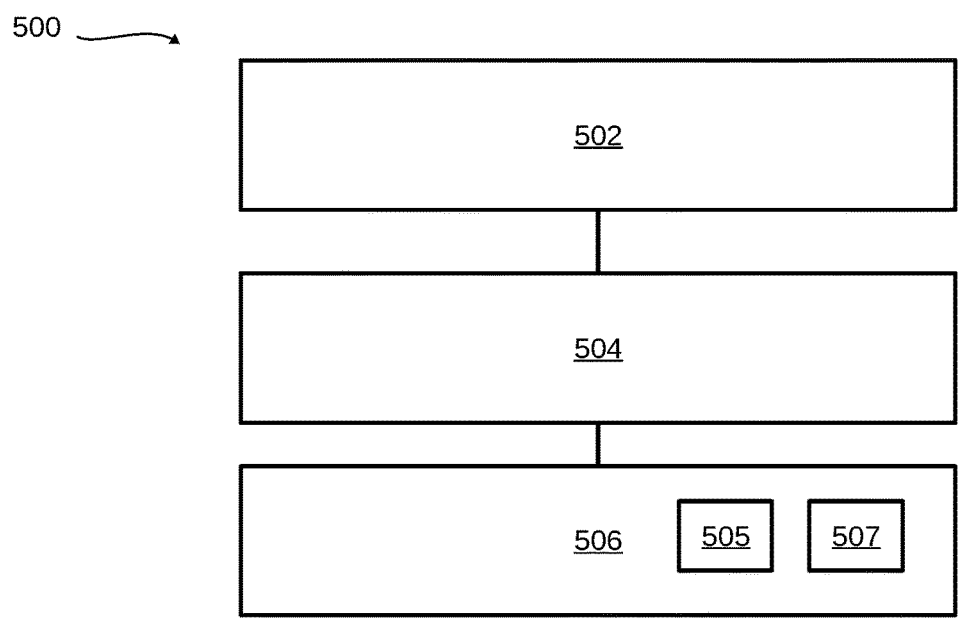
FIG. 5 is a control flow for a method of operation for the identification document holding system of FIG. 1.

Referring now to FIG. 5, therein is shown a control flow for a method 500 of operation for the identification document holding system 100 of FIG. 1. The method 500 includes: taking a photograph of a passport held in an identification document holding system 100 in a block 502; cropping the photograph and reading the ID details on the document in a block 504; and transmitting the photograph and the ID details to a server by cable 505, wifi, email, or USB 507 in a block 506.

Thus, it has been discovered that the identification document holding system furnishes important and heretofore unknown and unavailable solutions, capabilities, and functional aspects. The resulting configurations are straightforward, cost-effective, uncomplicated, highly versatile, accurate, sensitive, and effective, and can be implemented by adapting known components for ready, efficient, and economical manufacturing, application, and utilization.

While the identification document holding system has been described in conjunction with a specific best mode, it is to be understood that many alternatives, modifications, and variations will be apparent to those skilled in the art in light of the preceding description. Accordingly, it is intended to embrace all such alternatives, modifications, and variations, which fall within the scope of the included claims. All matters set forth herein or shown in the accompanying drawings are to be interpreted in an illustrative and non-limiting sense.

What is claimed is:

1. An identification document holding system comprising:
    an outer cover having:
        a hinge,
        a top flap having a top flap inner portion in direct contact with the hinge and a top flap body extending away from the top flap inner portion and the top flap body terminating in a top flap outer side, and
        a bottom flap having a bottom flap inner portion in direct contact with the hinge and a bottom flap body extending away from the bottom flap inner portion and the bottom flap body terminating in a bottom flap outer side;
    a top pocket with a top pocket opening near the hinge, and the top pocket configured to hold pages of the identification document;
    a bottom pocket with a bottom pocket opening at a distance larger than the distance between the top pocket opening and the hinge, the bottom pocket configured to hold a bottom end of an identification document and leave identification information on the identification document fully readable and exposed therefrom; and
    wherein the identification document holding system is configured to be fixed in an open position when the identification document is contained therein with the biodata page extended across the hinge and the biodata page exposed and fully readable between the bottom pocket and the top pocket.

2. The system of claim 1 wherein the top flap and the bottom flap are configured to extend beyond sides of the identification document and below the identification document at least half of the width of the identification document.

3. The system of claim 1 wherein the hinge is configured to be offset from a binding of the identification document.

4. The system of claim 1 wherein the top flap, the bottom flap, the top pocket, and the bottom pocket is a contrasting color for digital imaging and processing of the identification document.

5. The system of claim 1 further comprising stitches forming the top pocket and the bottom pocket.

6. The system of claim 1 wherein the hinge is a fabric formed integrally with the top flap and the bottom flap.

7. A method for operating a document holding system comprising:
    taking a photograph of a biodata page of an identification document held in an identification document holding system comprising:
        an outer cover having:
            a hinge,
            a top flap having a top flap inner portion in direct contact with the hinge and a top flap body extending away from the top flap inner portion and the top flap body terminating in a top flap outer side, and
            a bottom flap having a bottom flap inner portion in direct contact with the hinge and a bottom flap body extending away from the bottom flap inner portion and the bottom flap body terminating in a bottom flap outer side;
        a top pocket with a top pocket opening near the hinge and the top pocket configured to hold pages of the identification document;
        a bottom pocket with a bottom pocket opening at a distance larger than the distance between the top pocket opening and the hinge, the bottom pocket configured to hold a bottom end of an identification document and leave identification information on the identification document fully readable and exposed therefrom; and
        wherein the identification document holding system is configured to be fixed in an open position when the identification document is contained therein with the biodata page extended across the hinge and the biodata page exposed and fully readable between the bottom pocket and the top pocket; and
    cropping the photograph; and
    transmitting the photograph to a server.

8. The method of claim 7 wherein transmitting the photograph to the server includes transmitting the photograph by cable, wifi, email, or universal serial bus.

* * * * *